United States Patent
Kuster (10) Patent No.: US 10,423,555 B2
(45) Date of Patent: Sep. 24, 2019

(54) IN-CONNECTOR DATA STORAGE DEVICE

(71) Applicant: Martin Kuster, Walchwil (CH)

(72) Inventor: Martin Kuster, Walchwil (CH)

( * ) Notice: Subject to any disclaimer, the term of this patent is extended or adjusted under 35 U.S.C. 154(b) by 82 days.

(21) Appl. No.: 15/633,407

(22) Filed: Jun. 26, 2017

(65) Prior Publication Data

US 2017/0371820 A1     Dec. 28, 2017

Related U.S. Application Data

(60) Provisional application No. 62/354,664, filed on Jun. 24, 2016.

(51) Int. Cl.
| | |
|---|---|
| *G06F 1/18* | (2006.01) |
| *G06F 13/38* | (2006.01) |
| *G06F 13/16* | (2006.01) |
| *G06F 13/42* | (2006.01) |
| *G06F 1/16* | (2006.01) |
| *G06K 19/077* | (2006.01) |
| *H01R 13/66* | (2006.01) |
| *H01R 13/717* | (2006.01) |

(52) U.S. Cl.
CPC .......... *G06F 13/385* (2013.01); *G06F 1/1632* (2013.01); *G06F 13/1668* (2013.01); *G06F 13/4282* (2013.01); *G06K 19/07732* (2013.01); *H01R 13/6658* (2013.01); *H01R 13/7175* (2013.01)

(58) Field of Classification Search
None
See application file for complete search history.

(56) References Cited

U.S. PATENT DOCUMENTS

| | | | | |
|---|---|---|---|---|
| 8,705,243 B2* | 4/2014 | Kuster | ................. | G06F 1/185 361/752 |
| 2004/0153595 A1* | 8/2004 | Sukegawa | ............ | G06K 19/077 710/305 |
| 2006/0116009 A1* | 6/2006 | Langberg | ............. | G11B 33/122 439/76.1 |
| 2006/0185876 A1* | 8/2006 | Aviv | ........................ | G06F 1/16 174/50 |
| 2006/0219776 A1* | 10/2006 | Finn | ........................ | B60R 25/25 235/380 |
| 2011/0076867 A1* | 3/2011 | Achsaf | ................. | G06K 19/077 439/131 |

(Continued)

FOREIGN PATENT DOCUMENTS

| | | |
|---|---|---|
| JP | 2013004176 A | 1/2013 |
| TW | M387417 U | 8/2010 |

(Continued)

OTHER PUBLICATIONS

International Search Report and Written Opinion in Related PCT Application No. PCT/IB2017/053813 dated Oct. 9, 2017, 26 pages.

*Primary Examiner* — Hyun Nam
(74) *Attorney, Agent, or Firm* — Kilpatrick Townsend & Stockton LLP (57) ABSTRACT

A data storage device includes a case and a connector housed within the case. The connector includes a first connection interface having a plurality of connection fingers and a second connection interface having a plurality of springs. The case is positionable within a data storage device port such that the data storage device is completely disposed within the data storage device port when used.

18 Claims, 11 Drawing Sheets

(56) References Cited

U.S. PATENT DOCUMENTS

2012/0162891 A1* 6/2012 Tranchina ........... B60R 11/0252
361/679.26
2013/0258576 A1* 10/2013 Ben-Gad ............ G06K 13/0806
361/679.32

FOREIGN PATENT DOCUMENTS

| WO | WO2014019370 A1 | 2/2014 |
| WO | 2017221220 A1 | 12/2017 |

* cited by examiner

IN-CONNECTOR DATA STORAGE DEVICE

REFERENCE TO RELATED APPLICATIONS

This application claims the benefit of U.S. Provisional Application No. 62/354,664, filed Jun. 24, 2016, and entitled IN CONNECTOR USB 3/3.X FLASH DRIVE/SSD/SECURING DONGLE, the content of which is hereby incorporated by reference in its entirety.

FIELD OF THE INVENTION

This application relates to data storage devices and the like.

BACKGROUND

Universal serial bus ("USB") devices generally include a memory data storage device integrated with a USB interface. USB devices are typically used for similar purposes for which floppy disks or CD-ROMs were previously used, and are generally come in the form of USB sticks that are attachable to a USB connector of a computer or are external devices that are connected to the computer using a USB cable. However, USB devices are easily removed from the USB connector and generally project from the computer when connected and/or add additional bulky components for a user to handle.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

According to certain examples, a data storage device may include a case and a connector. The case may include a front edge, a back edge opposite the front edge, a top edge extending from the front edge to the back edge, and a bottom edge opposite the top edge and extending from the front edge to the back edge. The connector may be housed within the case and includes a first connection interface comprising a plurality of connection fingers and a second connection interface comprising a plurality of springs. The case may be positionable within a data storage device port such that the top edge, bottom edge, front edge, and back edge of the case are disposed within the data storage device port when used.

In some aspects, the case may be positionable such that the data storage device is completely disposed within the data storage port when used.

In various examples, the connector may include a substrate, at least one memory die stack, and a controller. The substrate may include a component surface and a connection surface opposite the component surface. The at least one memory die stack may be mounted on one of the connection surface and the component surface. The controller may be mounted on one of the connection surface and the component surface, and is configured to access the at least one memory die stack. In some examples, the first connection interface and the second connection interface are on the connection surface. In certain cases, the first interface may include a contact bar having a plurality of springs. In various examples, each of the plurality of springs may include a portion located a first distance relative to the connection surface, and the plurality of fingers are located a second distance relative to the connection surface that is less than the first distance. In some aspects, the plurality of fingers may be embedded on a body of an interface assembly including the first connection interface.

In certain examples, the at least one memory die stack may be mounted on top of the controller. In various cases, at least one of an epoxy cover or a support substrate may cover the controller and separate the at least one memory die stack from the controller. In some cases, the connector may further include a status indicator comprising a light emitting diode.

According to some examples, the case may include a first removal slot and a second removal slot, and the first removal slot and second removal slot may be engageable with a remover tool to remove the data storage device from the data storage device port when used.

In various aspects, the first connection interface may be configured to support USB 3.0 standards and the second connection interface is configured to support USB 2.0 standards.

According to certain examples, a data storage system may include a data storage device and a remover tool. The data storage device may include a case and a connector housed within the case. The case may include a first side edge, a second side edge opposite the first side edge, a first removal slot in the first side edge, and a second removal slot in the second side edge. The connector may include a first connection interface having a plurality of connection fingers and a second connection interface having a plurality of springs. The remover tool may include a body, a first remover tab, and a second remover tab. In various examples, the case may be positionable within a data storage device port such that the data storage device is completely disposed within the data storage device port when used. In some examples, the remover tool may be configured to engage the first remover tab with the first remover slot and the second remover tab with the second remover slot configured to remove the data storage device from the data storage port when used.

In some aspects, the case may include metal or plastic. In various examples, the connector may include a substrate, at least one memory die stack, and a controller. The substrate may include a component surface and a connection surface opposite the component surface. The at least one memory die stack may be mounted on one of the connection surface and the component surface, and the controller may be mounted on one of the connection surface and the component surface and configured to access the at least one memory die stack.

In certain examples, the first interface may include a contact bar comprising a cover and the plurality of springs. In various examples, each of the plurality of springs may include a portion located a first distance relative to the connection surface, and the plurality of fingers may be located a second distance relative to the connection surface that is less than the first distance.

In some examples, the at least one memory die stack may be mounted on top of the controller. According to some cases, the first connection interface may be configured to support USB 3.0 standards and the second connection interface may be configured to support USB 2.0 standards.

According to certain examples, a method of using a data storage device may include orienting the data storage device relative to a data storage device port. The data storage device may include a case and a connector housed within the case. The connector may include a first connection interface having a plurality of connection fingers and a second connection interface having a plurality of springs. The method may include positioning the data storage device within the data storage device port such that the data storage device is completely disposed within the data storage device port. The method may include establishing a connection between the data storage device and the data storage device port through the first connection interface or the second connection interface.

In some examples, the method may include removing the data storage device from the data storage device port by: inserting a remover tool into the data storage device port such that a first remover tab of the remover tool engages a first removal slot of the case and a second remover tab of the remover tool engages a second removal slot of the case; and withdrawing the remover tool from the data storage device port while the remover tool is engaged with the data storage device.

According to some aspects, the connection between the data storage device and the data storage device port is established through the first connection interface, and the method further includes re-orienting the data storage device relative to the data storage device port and positioning the data storage device within the data storage device port such that the data storage device is completely disposed within the data storage device port and a connection between the data storage device and the data storage device port is established through the second connection interface.

In various examples, the first connection interface supports a connection through USB 3.0 standards and wherein the second connection interface supports a connection through USB 2.0 standards.

Various implementations described in the present disclosure can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures can be designated by matching reference characters for the sake of consistency and clarity.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "up," "down," "top," "left," "right," "front," "back," and "corners," among others are intended to refer to the orientation as illustrated and described in the figure (or figures) to which the components and directions are referencing.

In one aspect, disclosed is an in-connector data storage device that fits completely within a data storage device port (e.g., a USB port) of an electronic device (e.g., laptop, computer, tablet, phone, various other electronic devices, etc.). As used herein, "fits completely" and similar phrasing refers to a configuration where the data storage device is within the data storage device port such that the data storage device does not extend or project outward from the data storage device port beyond the opening defined by the data storage device port. In this manner, the data storage device can stay in the port without affecting the handling of the electronic device (e.g., using the electronic device, packing the electronic device, carrying the electronic device, etc.) because the device is completely within the port and does not project or extend outwards from the electronic device. Moreover, the data storage device has increased security because when it is positioned completely within the port, it is not easily removable, and a tool is required to remove the data storage device. In some examples, the data storage device may include multiple interface connection standards.

FIGS. 1-6 illustrate an example of a data storage device 100. The data storage device 100 includes a case 102 and a connector 104 (see FIGS. 2-6) housed within the case 102. In some examples, the case 102 includes a front edge 106, a back edge 108, a top edge 110, and a bottom edge 112. In some examples, the front edge 106 is a connector side of the data storage device 100. The case 102 may also include a first side edge 114 and a second side edge 116. In some examples, the first side edge 114 and the second side edge 116 include removal slots 118. As described in detail below, a remover tool 1400 (see FIGS. 14 and 15) is configured to engage the removal slots 118 to remove the data storage device 100 from a data storage device port. Although removal slots 118 are illustrated, in other examples, grooves, indentations, or other similar features in the case 102 may be used for engagement with the remover tool 1400.

Figure 1:
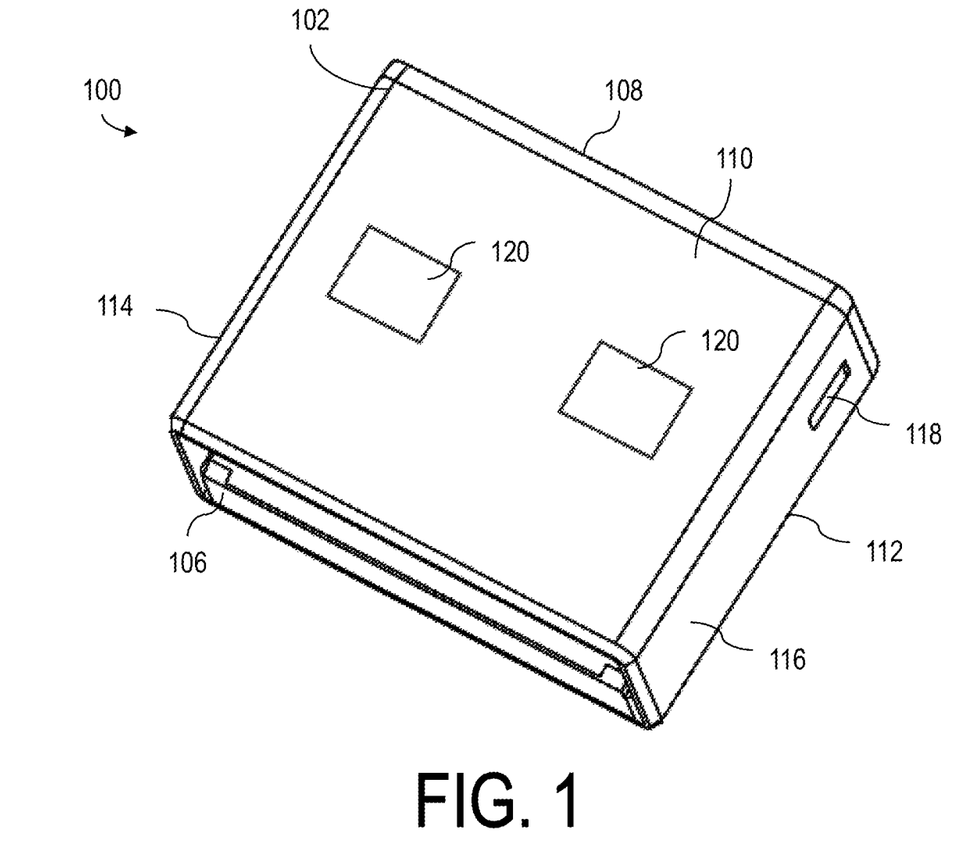
FIG. 1 is a perspective view of an in-connector data storage device according to aspects of the current disclosure.
Figure 2:
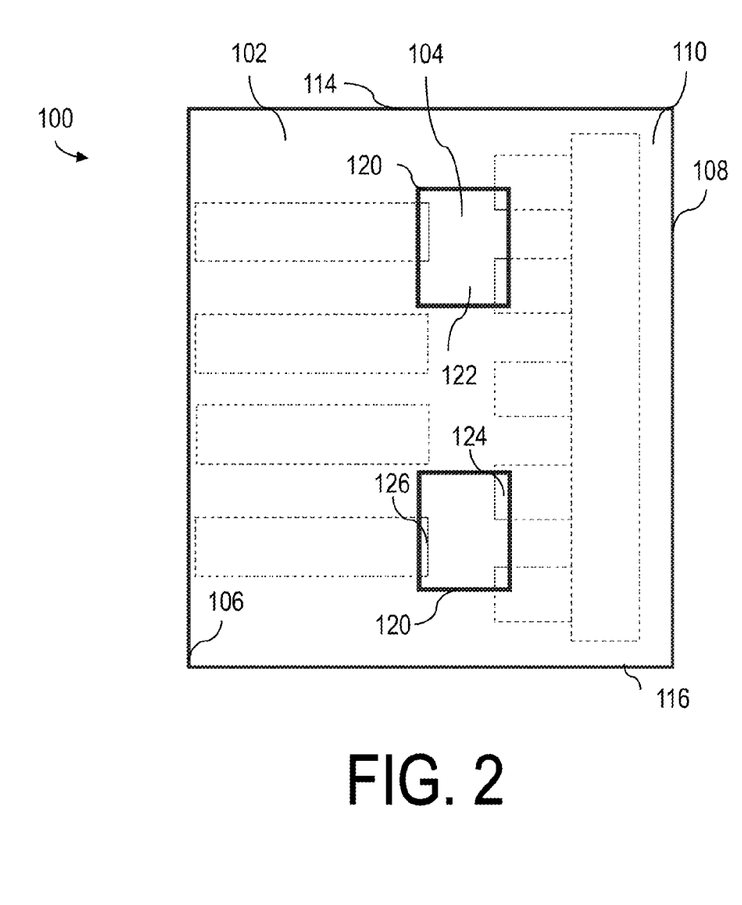
FIG. 2 is a top view of the in-connector data storage device of FIG. 1.

Optionally, the case 102 includes openings 120 in the top edge 110. The number of openings 120 should not be considered limiting on the current disclosure. In other examples, the openings 120 may be omitted. In some examples, the removal slots 118 may be omitted, and the remover tool 1400 may engage the openings 120 to remove the data storage device 100 from a data storage port.

The case 102 may be constructed from various materials such as various metals, plastics, or other suitable materials. In certain examples, the type of material used to construct the case 102 may be selected based on an intended use for the data storage device 100. As one non-limiting example, a case 102 constructed from metal may provide signal shielding and heat transfer or cooling. In certain examples, a status indicator or other indicator such as a light emitting diode may optionally be on at least one of the edges of the case 102.

Figure 3:
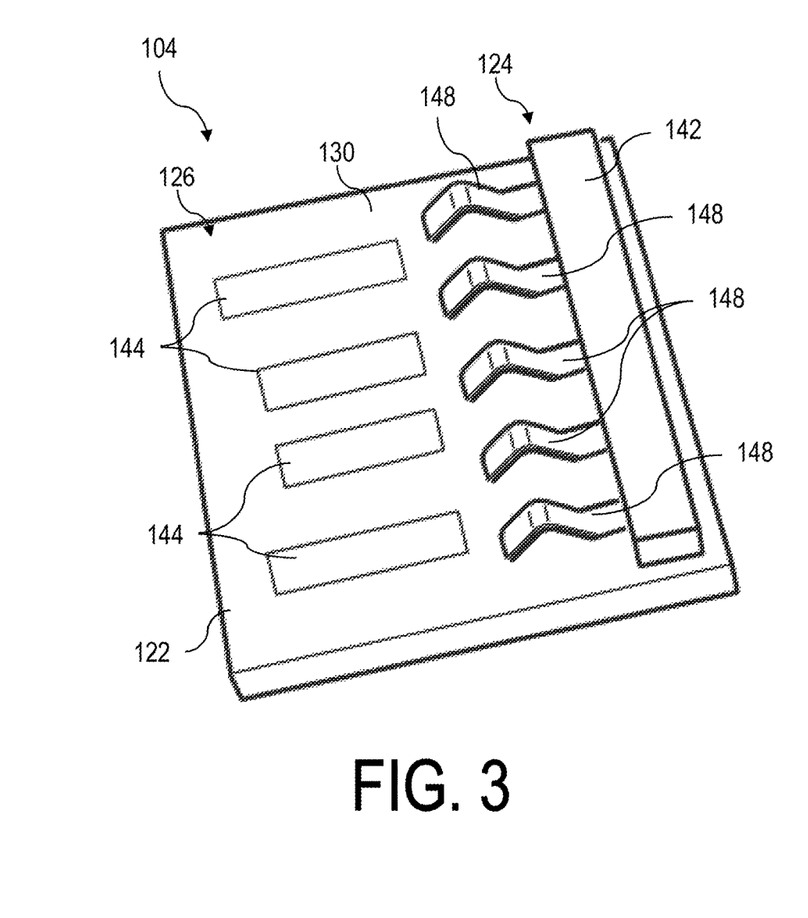
FIG. 3 is a perspective view of a connector of the in-connector data storage device of FIG. 1 including a substrate and a contact bar according to aspects of the current disclosure.
Figure 6:
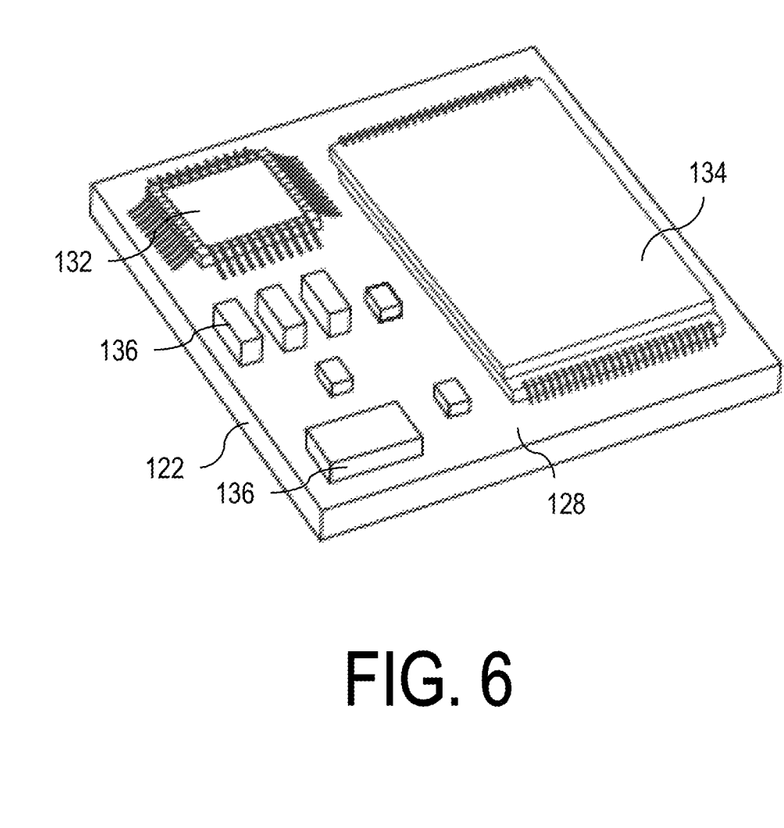
FIG. 6 is a perspective view of the substrate of the connector of FIG. 3.

The connector 104 includes a substrate 122, a first connection interface 124, and a second connection interface 126. The substrate 122 may be a printed circuit board ("PCB"), which may be used to mechanically support and electrically connect other components of the connector 104. The substrate 122 includes a component surface 128 and a connection surface 130. Various items such as an oscillator, an LED status light, other discrete components, or other suitable devices may be mounted and/or electrically coupled to the component surface 128 and the connection surface 130.

Referring to FIG. 6, in various examples, a controller 132 and at least one memory die stack 134 are provided on the substrate 122. Although the controller 132 and memory die 134 are illustrated as separate components, it will be appreciated that in various other examples, a single die may include both a controller and a memory (i.e., the controller and memory are a single component). In FIG. 6, the controller 132 and memory die stack 134 are on the component surface 128, although in other examples they may be on the connection surface 130. The controller 132 is configured to access the memory die stack 134. In various examples, the controller 132 and memory dies stack 134 may be configured for read operations, read/write operations, security or copy protection, or any combination thereof. Optionally, various surface mount devices 136 such as an oscillator, LED status light, discrete components, and/or other suitable devices are provided on the component surface 128 and/or the connection surface 130. In some examples, the components on the substrate 122 may be varied depending on desired functionality of the data storage device 100.

Figure 7:
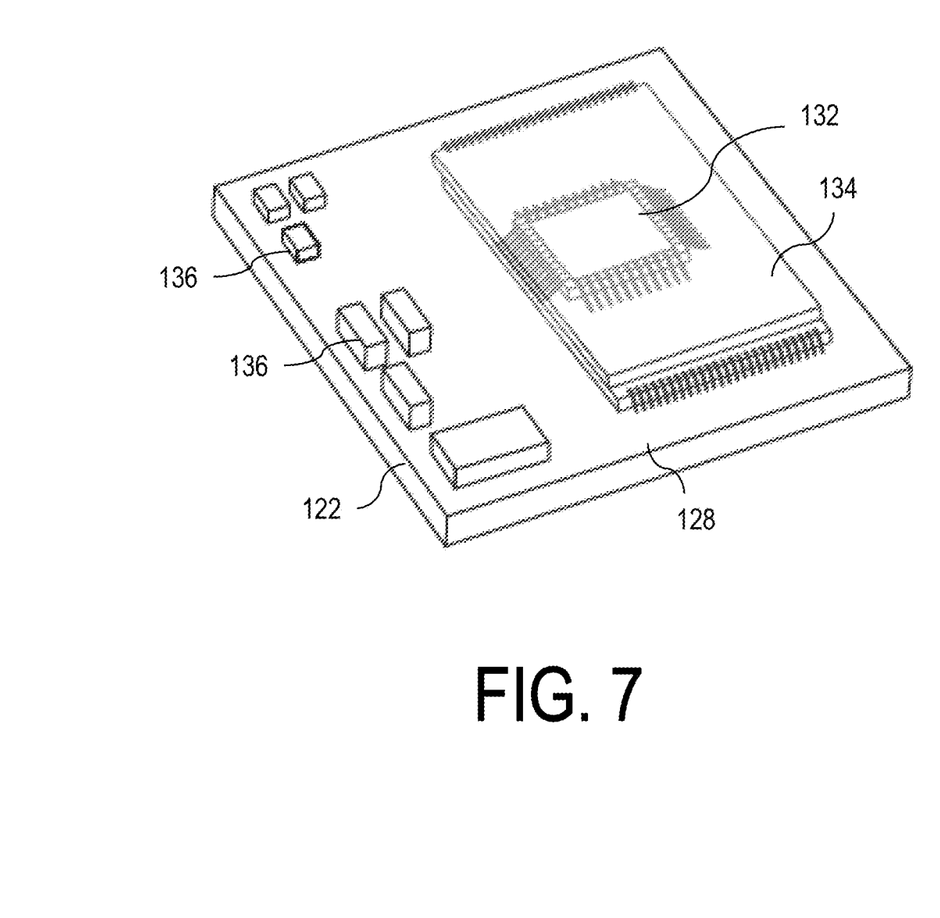
FIG. 7 is a perspective view of another substrate that may be used with the connector of FIG. 3 according to aspects of the present disclosure.
Figure 8:
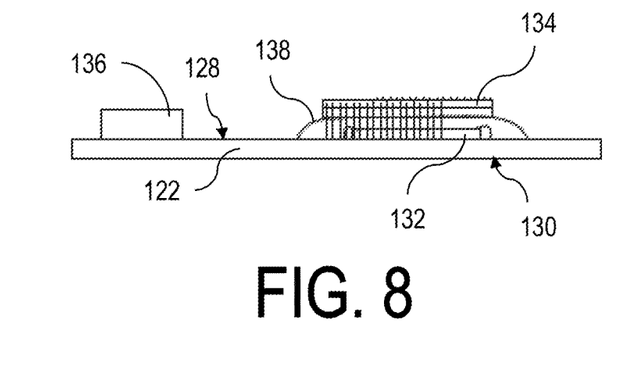
FIG. 8 is a side view of another substrate that may be used with the connector of FIG. 3 according to aspects of the present disclosure.
Figure 9:
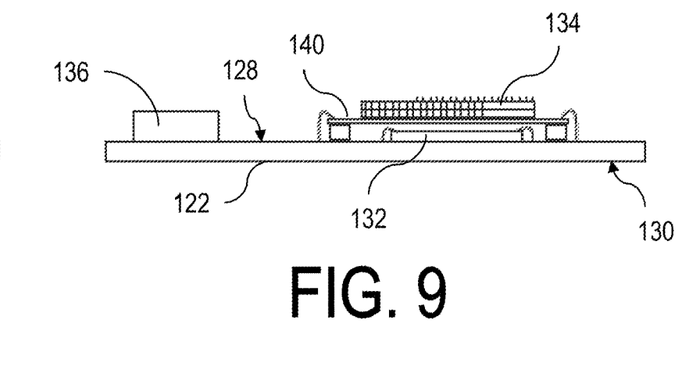
FIG. 9 is a side view of another substrate that may be used with the connector of FIG. 3 according to aspects of the present disclosure.

In some examples, as illustrated in FIG. 6, the various components may be mounted in various side-by-side configurations. In other examples, as illustrated in FIGS. 7-9, various components may be stacked to save space on the substrate 122 and reduce the footprint of the components. As one non-limiting example, FIGS. 7-9 illustrate connectors 104 where the substrate 122 includes the memory die stack 134 mounted on top of the controller 132. In some examples, the memory die stack 134 may be mounted on top of the controller 132 through an epoxy cover 138 or other suitable cover that covers the controller 132 to protect the wires of the controller 132 (see FIG. 8). In other examples, the memory die stack 134 may be mounted on top of the controller 132 through support substrate 140 or other suitable device (see FIG. 9). In these examples, the memory die stack 134 may be mounted on the support substrate 140 to separate the memory die stack 134 from the controller 132 and protect the controller wires. Similar to the substrate 122, the support substrate 140 may be a PCB.

The connector 104 is configured to support multiple interface connection standards such that the connector 104 may couple to a corresponding USB 2.0 connector, USB 3.0 connector, or any other standard that is forward or backwards compatible with any of the foregoing USB standards, other suitable serial bus connections, parallel bus connections, or other suitable connection standards when the data storage device 100 is positioned within a corresponding port. To support the multiple interface connection standards, the connector includes at least the first connection interface 124 and the second connection interface 126.

Figure 4:
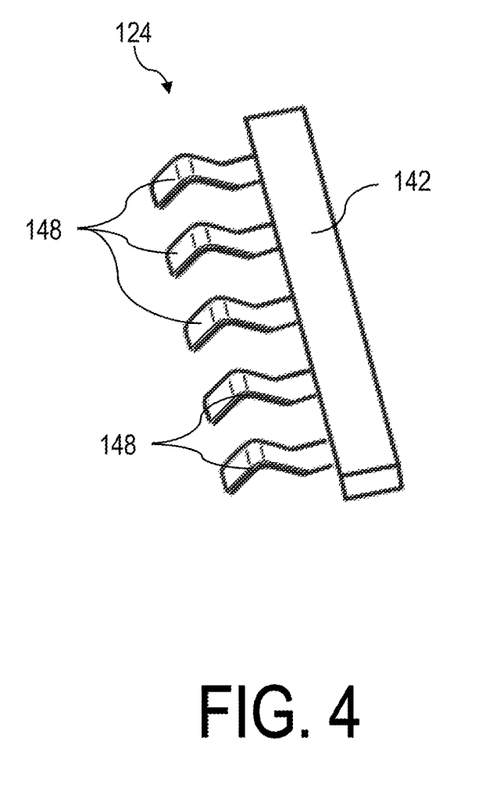
FIG. 4 is a top perspective view of the contact bar of the connector of FIG. 3.
Figure 5:
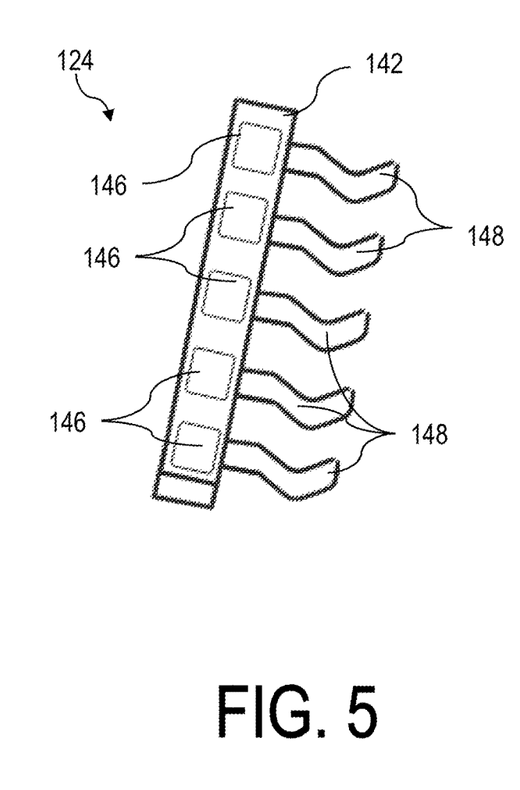
FIG. 5 is a bottom perspective view of the contact bar of FIG. 3.

As illustrated in FIGS. 3-5, in some examples, the first connection interface 124 includes a contact bar 142. In various examples, the contact bar 142 is mounted to a surface of the substrate 122, such as the connection surface 130. The contact bar 142 may be electrically coupled to the substrate 122 through connection pads 146, which may be soldered or otherwise coupled to the substrate 122. The number of coupling points should not be considered limiting on the current disclosure. In various examples, the contact bar 142 projects outward from an otherwise substantially flat connection surface 130. A plurality of projections 148 are connected to the contact bar 142. In some examples, the projections 148 include springs, although various other types of projections may be used such that the first connection interface 124 supports the USB 3.0 standard and connects to a USB 3.0 connector, or supports other suitable standards.

The second connection interface 126 includes a plurality of connection fingers 144. The connection fingers 144 may be mounted to or embedded on a surface of the substrate 122, such as the connection surface 130. In various examples, a distance from the connection fingers 144 to the connection surface 130 (or other surface on which the connection fingers 144 are positioned) is less than a distance from the projections 148 to the connection surface 130. In various examples, the second connection interface 126 with the connection fingers 144 is configured to support the USB 2.0 standard and connect to a USB 2.0 connector. In such examples, the connection fingers 144 may be configured to electrically couple to the power and ground wires and the twisted pair of wires of the corresponding USB 2.0 connector when the data storage device 100 is inserted within the corresponding port. The number of connection fingers 144 should not be considered limiting on the current disclosure. The second connection interface may support other suitable standard.

Figure 10:
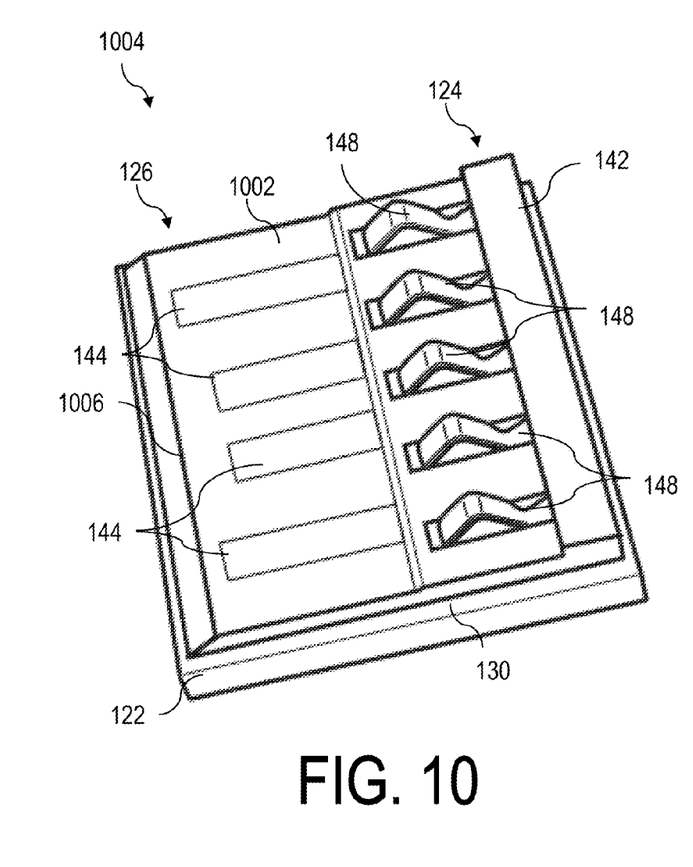
FIG. 10 is a perspective view of another connector that may be used with the data storage device of FIG. 1 including a substrate and a contact bar according to aspects of the current disclosure.
Figure 11:
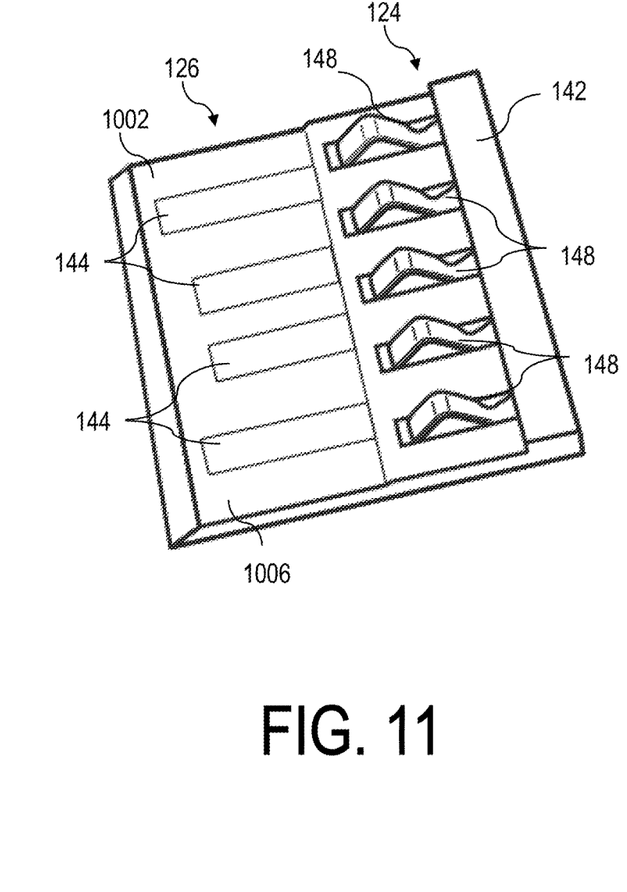
FIG. 11 is a top perspective view of the contact bar of the connector of FIG. 10.
Figure 12:
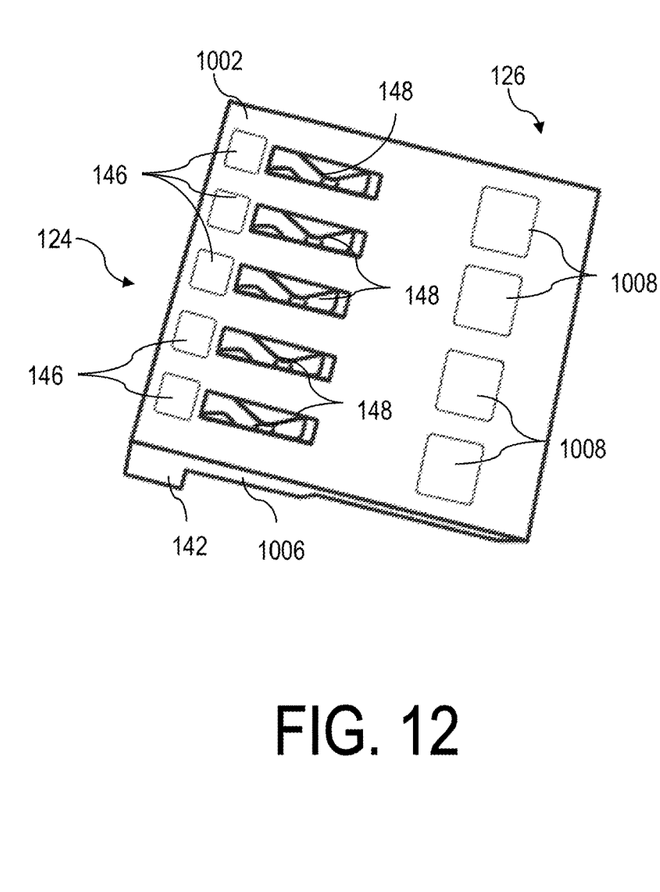
FIG. 12 is a bottom perspective view of the contact bar of the connector of FIG. 10.

FIGS. 10-12 illustrate another example of a connector 1004 according to aspects of the present disclosure. Compared to the connector 104, the connector 1004 includes an interface assembly 1002 may be mounted on the substrate 122. The interface assembly 1002 includes a combination of the first connection interface 124 and the second connection interface 126. In these examples, the connection fingers 144 may be mounted to or embedded within a body 1006 of the interface assembly 1002. In some examples, a portion of the body 1006 forms the contact bar 142. The connection pads 146 for the first connection interface 124 and connection pads 1008 for the second connection interface 126 are also provided on the body 1006, the number of which should not be considered limiting on the current disclosure. In some examples, the pads 146 and 1008 are on a bottom side of the body 1006.

Various other suitable types of connectors that may be used with the data storage device 100 are described in U.S. Pat. No. 8,705,243, the content of which is hereby incorporated by reference in its entirety.

Figure 13:
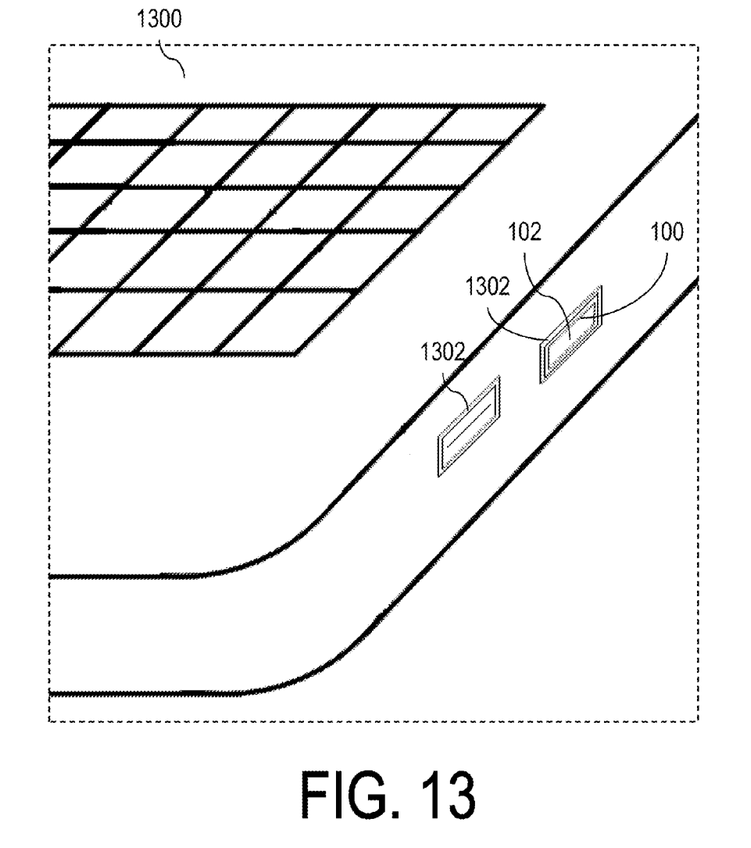
FIG. 13 illustrates an example of the in-connector data storage device of FIG. 1 positioned within a data storage device port according to aspects of the present disclosure.

FIG. 13 illustrates an example of the data storage device 100 positioned within a data storage device port 1302 of an electronic device 1300. The case 102 is positionable within the data storage device port 1302 such that the data storage device 100 is completely disposed within the port 1302. In some examples, the edges 106, 108, 110, and 112 are positioned within the port 1302 such that the data storage device 100 does not project outwards from the opening defined by the port 1302. By being positioned completely within the port 1302, the data storage device 100 may remain within the port 1302 without interfering with the handling of the electronic device 1300. As one non-limiting example, the data storage device 100 may provide an easy way to upgrade the electronic device's storage capacity without interfering with normal handling of the electronic device 1300.

Figure 14:
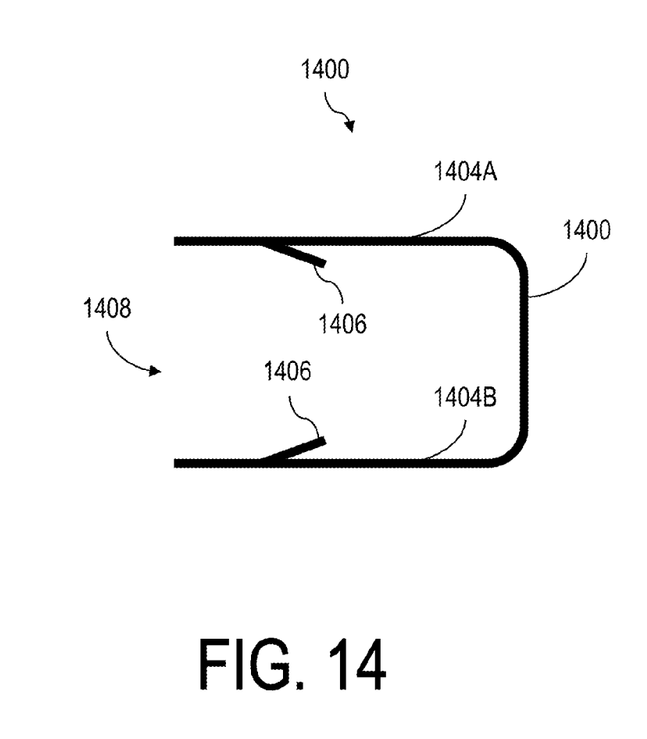
FIG. 14 is a top view of a removal tool according to aspects of the present disclosure.
Figure 15:
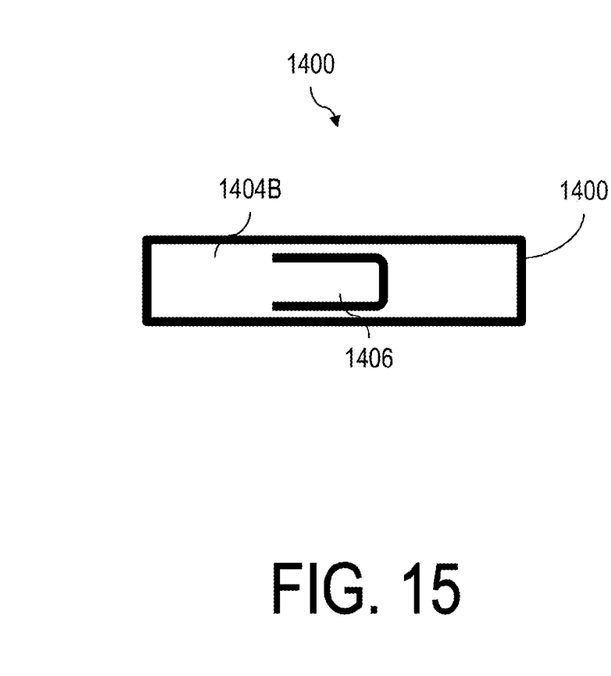
FIG. 15 is a side view of the removal tool of FIG. 14.

As illustrated in FIG. 13, because the data storage device 100 is completely disposed within the port 1302 and does not extend outwards from the opening defined by the port 1302, the data storage device 100 is not easily removable. Referring to FIG. 14, the remover tool 1400 is provided to remove the data storage device 100 by inserting the remover tool 1400 within the port 1302, engaging the removal slots 118 of the data storage device 100, and withdrawing the remover tool 1400 and data storage device 100. The remover tool 1400 includes a body 1402 and arms 1404A-B. In various examples, the arms 1404A-B are spaced apart to accommodate a width of the data storage device 100, such as a distance between two edges of the data storage device. In some examples, the arms 1404A-B define a receiving area 1408 that receives at least a portion the data storage device 100 when the remover tool 1400 engages the data storage device 100. Each arm 1404A-B includes a remover tab 1406 that is configured to engage a corresponding removal slot 118 and maintain the engagement between the remover tool 1400 and data storage device 100 as the remover tool 1400 withdraws the data storage device 100 from the port 1302.

A collection of exemplary embodiments, including at least some explicitly enumerated as "ECs" (Example Combinations), providing additional description of a variety of embodiment types in accordance with the concepts described herein are provided below. These examples are not meant to be mutually exclusive, exhaustive, or restrictive; and the invention is not limited to these example embodiments but rather encompasses all possible modifications and variations within the scope of the issued claims and their equivalents.

EC 1. A data storage device comprising: a case comprising a front edge, a back edge opposite the front edge, a top edge extending from the front edge to the back edge, and a bottom edge opposite the top edge and extending from the front edge to the back edge; and a connector housed within the case, the connector comprising a first connection interface comprising a plurality of connection fingers and a second connection interface comprising a plurality of springs, wherein the case is positionable within a data storage device port such that the top edge, bottom edge, front edge, and back edge of the case are disposed within the data storage device port when used.

EC 2. The data storage device of the preceding or subsequent example combinations, wherein the case is positionable such that the data storage device is completely disposed within the data storage port when used.

EC 3. The data storage device of the preceding or subsequent example combinations, wherein the connector further comprises: a substrate comprising a component surface and a connection surface opposite the component surface; at least one memory die stack mounted on one of the connection surface and the component surface; and a controller mounted on one of the connection surface and the component surface and configured to access the at least one memory die stack, wherein the first connection interface and the second connection interface are on the connection surface.

EC 4. The data storage device of the preceding or subsequent example combinations, wherein the first interface comprises a contact bar comprising a cover and the plurality of springs, wherein each of the plurality of springs comprise a portion located a first distance relative to the connection surface, and wherein the plurality of fingers are located a second distance relative to the connection surface that is less than the first distance.

EC 5. The data storage device of the preceding or subsequent example combinations, wherein the plurality of fingers are embedded on the cover.

EC 6. The data storage device of the preceding or subsequent example combinations, wherein the at least one memory die stack is mounted on top of the controller.

EC 7. The data storage device of the preceding or subsequent example combinations, wherein at least one of an epoxy cover or a support substrate covers the controller and separates the at least one memory die stack from the controller EC 8. The data storage device of the preceding or subsequent example combinations, wherein the connector further comprises a status indicator comprising a light emitting diode.

EC 9. The data storage device of the preceding or subsequent example combinations, wherein the case further comprises a first removal slot and a second removal slot, and wherein the first removal slot and second removal slot are engageable with a remover tool to remove the data storage device from the data storage device port when used.

EC 10. The data storage device of the preceding or subsequent example combinations, wherein the first connection interface is configured to support Universal Serial Bus ("USB") 3.0 standards and wherein the second connection interface is configured to support USB 2.0 standards.

EC 11. A data storage system comprising: a data storage device comprising: a case comprising a first side edge, a second side edge opposite the first side edge, a first removal slot in the first side edge, and a second removal slot in the second side edge; and a connector housed within the case, the connector comprising a first connection interface comprising a plurality of connection fingers and a second connection interface comprising a plurality of springs; and a remover tool comprising a body, a first remover tab, and a second remover tab, wherein the case is positionable within a data storage device port such that the data storage device is completely disposed within the data storage device port when used, and wherein the remover tool is configured to engage the first remover tab with the first remover slot and the second remover tab with the second remover slot configured to remove the data storage device from the data storage port when used.

EC 12. The data storage system of the preceding or subsequent example combinations, wherein the case comprises metal.

EC 13. The data storage system of the preceding or subsequent example combinations, wherein the connector further comprises: a substrate comprising a component surface and a connection surface opposite the component surface; at least one memory die stack mounted on one of the connection surface and the component surface; and a controller mounted on one of the connection surface and the component surface and configured to access the at least one memory die stack.

EC 14. The data storage system of the preceding or subsequent example combinations, wherein the first interface comprises a contact bar comprising a cover and the plurality of springs, wherein each of the plurality of springs comprise a portion located a first distance relative to the connection surface, and wherein the plurality of fingers are located a second distance relative to the connection surface that is less than the first distance.

EC 15. The data storage system of the preceding or subsequent example combinations, wherein the at least one memory die stack is mounted on top of the controller.

EC 16. The data storage system of the preceding or subsequent example combinations, wherein the first connection interface is configured to support Universal Serial Bus ("USB") 3.0 standards and wherein the second connection interface is configured to support USB 2.0 standards.

EC 17. A method of using a data storage device comprising: orienting the data storage device relative to a data storage device port, wherein the data storage device comprises a case and a connector housed within the case, and wherein the connector comprises a first connection interface comprising a plurality of connection fingers and a second connection interface comprising a plurality of springs; and positioning the data storage device within the data storage device port such that the data storage device is completely disposed within the data storage device port; and establishing a connection between the data storage device and the data storage device port through the first connection interface or the second connection interface.

EC 18. The method of the preceding or subsequent example combinations, further comprising removing the data storage device from the data storage device port by: inserting a remover tool into the data storage device port such that a first remover tab of the remover tool engages a first removal slot of the case and a second remover tab of the remover tool engages a second removal slot of the case; and withdrawing the remover tool from the data storage device port while the remover tool is engaged with the data storage device.

EC 19. The method of the preceding or subsequent example combinations, wherein the connection between the data storage device and the data storage device port is established through the first connection interface, and wherein the method further comprises re-orienting the data storage device relative to the data storage device port and positioning the data storage device within the data storage device port such that the data storage device is completely disposed within the data storage device port and a connection between the data storage device and the data storage device port is established through the second connection interface.

EC 20. The method of the preceding or subsequent example combinations, wherein the first connection interface supports a connection through Universal Serial Bus ("USB") 3.0 standards and wherein the second connection interface supports a connection through USB 2.0 standards.

EC. 21. The data storage device of the preceding or subsequent example combinations, wherein a single die comprises both a memory and a controller.

EC. 22. A data storage device comprising: a case; and a connector housed within the case, the connector comprising a first connection interface configured to support a first connection standard and a second connection interface configured to support a second connection standard, wherein the case is positionable within a data storage device port such that the case is completely disposed within the data storage device port when used.

EC. 23. The data storage device of any preceding or subsequent example combinations, wherein the connector further comprises: a substrate comprising a component surface and a connection surface opposite the component surface; at least one memory die stack; and a controller configured to access the at least one memory die stack, wherein the first connection interface comprises a plurality of connection fingers on the connection surface, and wherein the second connection interface comprises a plurality of springs on the connection surface.

EC. 24. The data storage device of any preceding or subsequent example combinations, wherein the first connection interface supports a connection through Universal Serial Bus ("USB") 3.0 standards and comprises a plurality of connection fingers, and wherein the second connection interface supports a connection through USB 2.0 standards and comprises a plurality of springs.

It should be emphasized that the above-described aspects are merely possible examples of implementations, merely set forth for a clear understanding of the principles of the present disclosure. Many variations and modifications can be made to the above-described embodiment(s) without departing substantially from the spirit and principles of the present disclosure. All such modifications and variations are intended to be included herein within the scope of the present disclosure, and all possible claims to individual aspects or combinations of elements or steps are intended to be supported by the present disclosure. Moreover, although specific terms are employed herein, as well as in the claims that follow, they are used only in a generic and descriptive sense, and not for the purposes of limiting the described invention, nor the claims that follow.

That which is claimed:

1. A data storage device comprising:
a case comprising a front edge, a back edge opposite the front edge, a top edge extending from the front edge to the back edge, and a bottom edge opposite the top edge and extending from the front edge to the back edge; and
a connector housed within the case, the connector comprising a first connection interface configured to support a first connection standard and a second connection interface configured to support a second connection standard,
wherein the case is positionable within a data storage device port such that the top edge, bottom edge, front edge, and back edge of the case are completely disposed within the data storage device port when used, and wherein the case further comprises a first removal slot and a second removal slot, and wherein the first removal slot and second removal slot are engageable with a remover tool to remove the data storage device from the data storage device port when used.

2. The data storage device of claim 1, wherein the connector further comprises:
   a substrate comprising a component surface and a connection surface opposite the component surface;
   at least one memory die stack; and
   a controller configured to access the at least one memory die stack,
   wherein the first connection interface comprises a plurality of connection fingers on the connection surface, and
   wherein the second connection interface comprises a plurality of springs on the connection surface.

3. The data storage device of claim 2, wherein the least one memory die stack is mounted on one of the connection surface and the component surface, and wherein the controller is mounted on one of the connection surface and the component surface.

4. The data storage device of claim 2, wherein the at least one memory die stack is mounted on top of the controller.

5. The data storage device of claim 4, wherein at least one of an epoxy cover or a support substrate covers the controller and separates the at least one memory die stack from the controller.

6. The data storage device of claim 2, wherein the first interface comprises a contact bar comprising the plurality of springs, wherein each of the plurality of springs comprise a portion located a first distance relative to the connection surface, and wherein the plurality of fingers are located a second distance relative to the connection surface that is less than the first distance.

7. The data storage device of claim 6, wherein the connector further comprises a status indicator comprising a light emitting diode.

8. The data storage device of claim 6, wherein the plurality of fingers are embedded on a body of an interface assembly comprising the first connection interface.

9. The data storage device of claim 1, wherein the first connection interface is configured to support Universal Serial Bus ("USB") 3.0 standards and wherein the second connection interface is configured to support USB 2.0 standards.

10. A data storage system comprising:
    a data storage device comprising:
      a case comprising a first side edge, a second side edge opposite the first side edge, a first removal slot in the first side edge, and a second removal slot in the second side edge; and
      a connector housed within the case, the connector comprising a first connection interface comprising a plurality of connection fingers and a second connection interface comprising a plurality of springs; and
    a remover tool comprising a body, a first remover tab, and a second remover tab,
    wherein the case is positionable within a data storage device port such that the data storage device is completely disposed within the data storage device port when used, and
    wherein the remover tool is configured to engage the first remover tab with the first remover slot and the second remover tab with the second remover slot to remove the data storage device from the data storage port when used.

11. The data storage system of claim 10, wherein the case comprises metal.

12. The data storage system of claim 10, wherein the connector further comprises:
    a substrate comprising a component surface and a connection surface opposite the component surface;
    at least one memory die stack; and
    a controller configured to access the at least one memory die stack.

13. The data storage system of claim 12, wherein the first interface comprises a contact bar comprising a cover and the plurality of springs, wherein each of the plurality of springs comprise a portion located a first distance relative to the connection surface, and wherein the plurality of fingers are located a second distance relative to the connection surface that is less than the first distance.

14. The data storage system of claim 12, wherein the at least one memory die stack is mounted on top of the controller.

15. The data storage system of claim 10, wherein the first connection interface is configured to support Universal Serial Bus ("USB") 3.0 standards and wherein the second connection interface is configured to support USB 2.0 standards.

16. A method of using a data storage device comprising:
    orienting the data storage device relative to a data storage device port, wherein the data storage device comprises a case and a connector housed within the case, and wherein the connector comprises a first connection interface configured to support a first connection standard and a second connection interface configured to support a second connection standard;
    positioning the data storage device within the data storage device port such that the data storage device is completely disposed within the data storage device port;
    establishing a connection between the data storage device and the data storage device port through the first connection interface or the second connection interface; and
    selectively removing the data storage device from the data storage device port by:
      inserting a remover tool into the data storage device port such that a first remover tab of the remover tool engages a first removal slot of the case and a second remover tab of the remover tool engages a second removal slot of the case; and
      withdrawing the remover tool from the data storage device port while the remover tool is engaged with the data storage device.

17. The method of claim 16, wherein the connection between the data storage device and the data storage device port is established through the first connection interface, and wherein the method further comprises re-orienting the data storage device relative to the data storage device port and positioning the data storage device within the data storage device port such that the data storage device is completely disposed within the data storage device port and a connection between the data storage device and the data storage device port is established through the second connection interface.

18. The method of claim 16, wherein the first connection interface supports a connection through Universal Serial Bus ("USB") 3.0 standards and comprises a plurality of connection fingers, and wherein the second connection interface supports a connection through USB 2.0 standards and comprises a plurality of springs.

* * * * *